(12) United States Patent
Liu et al.

(10) Patent No.: US 9,116,758 B2
(45) Date of Patent: Aug. 25, 2015

(54) METHOD AND SYSTEM FOR SHARING A HOTKEY BETWEEN APPLICATION INSTANCES

(71) Applicant: TENCENT TECHNOLOGY (SHENZHEN) COMPANY LIMITED, Shenzhen, Guangdong (CN)

(72) Inventors: Huantong Liu, Shenzhen (CN); Weiwen Xie, Shenzhen (CN); Xin Xie, Shenzhen (CN); Shundong Gao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/372,703

(22) PCT Filed: Jan. 18, 2013

(86) PCT No.: PCT/CN2013/070675
§ 371 (c)(1),
(2) Date: Jul. 16, 2014

(87) PCT Pub. No.: WO2013/107381
PCT Pub. Date: Jul. 25, 2013

(65) Prior Publication Data
US 2014/0380335 A1    Dec. 25, 2014

(30) Foreign Application Priority Data
Jan. 19, 2012    (CN) .......................... 2012 1 0018110

(51) Int. Cl.
G06F 3/00       (2006.01)
G06F 9/44       (2006.01)
G06F 9/46       (2006.01)
G06F 13/00      (2006.01)
G06F 9/54       (2006.01)
G06F 3/0489     (2013.01)

(52) U.S. Cl.
CPC ................ *G06F 9/54* (2013.01); *G06F 3/0489* (2013.01); *G06F 9/542* (2013.01); *G06F 2209/543* (2013.01)

(58) Field of Classification Search
None
See application file for complete search history.

(56) References Cited

U.S. PATENT DOCUMENTS

| 2005/0076331 | A1* | 4/2005 | Das et al. ...................... 717/114 |
| 2007/0162875 | A1  | 7/2007 | Paquette et al. |
| 2007/0212100 | A1  | 9/2007 | Kimoto et al. |
| 2015/0033007 | A1* | 1/2015 | Liu et al. ....................... 713/100 |

FOREIGN PATENT DOCUMENTS

| CN | 1858683 A   | 11/2006 |
| CN | 101799719 A | 8/2010  |

OTHER PUBLICATIONS

International Search Report for PCT/CN2013/070675, ISACN, Beijing, mailed Apr. 25, 2013.
Written Opinion of the International Searching Authority for PCT/CN2013/070675, mailed Apr. 25, 2013 (in English and Chinese); ISA/CN.

* cited by examiner

*Primary Examiner* — Craig Dorais
(74) *Attorney, Agent, or Firm* — Harness, Dickey & Pierce, P.L.C.

(57) ABSTRACT

According to an example, when there is a hotkey message of a hotkey, an application instance that registers the hotkey receives the hotkey message, distributes the hotkey message to an application instance that does not register the hotkey, determines whether there is an application instance that does not register the hotkey and is to process the hotkey message; when there is the application instance that does not register the hotkey and is to process the hotkey message, receives feedback information about processing the hotkey message returned from the application instance that does not register the hotkey; and when there is not the application instance that does not register the hotkey and is to process the hotkey message, processes the hotkey message.

11 Claims, 4 Drawing Sheets

METHOD AND SYSTEM FOR SHARING A HOTKEY BETWEEN APPLICATION INSTANCES

CROSS-REFERENCE TO RELATED APPLICATIONS

This application is a U.S. National Phase application under 35 U.S.C. §371 of International Application No. PCT/CN2013/070675, filed on Jan. 18, 2013, entitled "Method and System for Sharing a Hotkey between Application Instances", the entire disclosures of which are incorporated herein by reference.

FIELD

The present disclosure relates to computer technology, and more particularly, to a method and a system for sharing a hotkey between application instances.

BACKGROUND

When using a computer, a user often uses a variety of applications, such as an instant messaging (IM) software tool. Usually, in order to facilitate the user to use an application, the application may employ a hotkey function provided by a system, or the user may register a hotkey for the application. A hotkey may be a shortcut key, which may be a combination of several special keys on a keyboard and may implement a specific task. Work efficiency may be significantly improved through using the hotkey. For example, a hotkey like Del+Ctrl+Alt may open a task manager under a windows operating system.

SUMMARY

Examples of the present disclosure provide a method for sharing a hotkey between application instances, so that hotkey conflict between applications may be solved and hotkey resources may be shared.

Examples of the present disclosure provide a system for sharing a hotkey between application instances, so that the hotkey conflict between applications may be solved and the hotkey resources may be shared.

The technical solution provided by the examples of the present disclosure is shown as follows.

A method for sharing a hotkey between application instances includes:
  when there is a hotkey message of a first hotkey, receiving, by an application instance that registers the first hotkey, the hotkey message;
  distributing, by the application instance that registers the first hotkey, the hotkey message to an application instance that does not register the first hotkey;
  determining whether there is an application instance that does not register the first hotkey and is to process the hotkey message;
  in response to a determination that there is the application instance that does not register the first hotkey and is to process the hotkey message, receiving feedback information about processing the hotkey message returned from the application instance that does not register the first hotkey; and
  in response to a determination that there is not the application instance that does not register the first hotkey and is to process the hotkey message, processing, by the application instance that registers the first hotkey, the hotkey message.

A system for sharing a hotkey between application instances includes a first application instance, wherein the first application instance registers a first hotkey and includes:
  a registering module, to receive, when there is a hotkey message of the first hotkey, the hotkey message;
  a distributing module, to distribute the hotkey message to an application instance that does not register the first hotkey; and
  a processing module, to
    determine whether there is an application instance that does not register the first hotkey and is to process the hotkey message,
    in response to a determination that there is the application instance that does not register the first hotkey and is to process the hotkey message, receive feedback information about processing the hotkey message returned from the application instance that does not register the first hotkey; and
    in response to a determination that there is not the application instance that does not register the first hotkey and is to process the hotkey message, process the hotkey message.

As may be seen from the above technical solution, according to examples of the present disclosure, when there is a hotkey message of the first hotkey, an application instance that registers the first hotkey may receive the hotkey message, distribute the hotkey message to an application instance that does not register the first hotkey, and may determine whether there is an application instance that does not register the first hotkey and is to process the hotkey message; in response to a determination that there is the application instance that does not register the first hotkey and is to process the hotkey message, receive feedback information about processing the hotkey message returned from the application instance that does not register the first hotkey; otherwise, in response to a determination that there is not the application instance that does not register the first hotkey and is to process the hotkey message, the application instance that registers the first hotkey may process the hotkey message. As may be seen that when examples of the present disclosure are employed, after receiving a hotkey message, an application instance that registers a hotkey may firstly send the hotkey message to another application instance that does not register the hotkey, and the application instance that registers the hotkey may process the hotkey message when the other application instance that does not register the hotkey may not need to process the hotkey message. By this manner, all of the application instances (both the application instance that registers the hotkey and the application instance that does not register the hotkey) may have an opportunity to process the hotkey message. As such, hotkey conflict between applications (either between applications with different application types or between different application instances belonging to applications with a same type) may be solved, so that the hotkey resources may be shared and the accuracy of hotkey response may be improved.

Further, when the examples of the present disclosure are employed, between application instances, when an application instance that currently registers a hotkey exits, the application instance that currently registers the hotkey may notify a next application instance to register the hotkey, so that the transitivity of the hotkey may be ensured, the hotkey may be shared, and the accuracy of hotkey response may be improved.

DETAILED DESCRIPTION

Hereinafter, the present disclosure will be described in further detail with reference to the accompanying drawings and exemplary examples.

Usually, one application may run a plurality of instances. Taking an IM application as an example, a plurality of IM applications, i.e., a plurality of instances may be run simultaneously. A plurality of instances of the application running simultaneously may be referred to as a plurality of application instances with this application type.

However, either a hotkey used among a plurality of applications with various application types running simultaneously or a hotkey used among a plurality of application instances with a same application type running simultaneously may usually be exclusive. If an application registers a hotkey, another application may not register the hotkey again. Likewise, if an application instance registers a hotkey, another application instance with a same application type may not register the hotkey again. As such, the application instance that fails to register the hotkey may not provide a convenient utilization way for users.

It is assumed that three IM application instances with a same type are running, in which the three IM application instances may respectively be referred to as AIM, BIM, and CIM. When started up, each of the IM application instances may attempt to register a hotkey formed by a same key combination. However, an IM application instance that may firstly register the hotkey (e.g., AIM) may successfully register the hotkey. When the user activates the hotkey, AIM may receive a hotkey message (e.g., a hotkey for extracting a message (a default key combination may be Ctrl+Atl+Z)). AIM successfully registers the hotkey, BIM and CIM may fail to register the hotkey.

In circumstance 1: AIM, BIM, and CIM are running simultaneously, and AIM successfully registers the hotkey for extracting a message. At this time, if a message is sent to BIM, the user may press Ctrl+Atl+Z to trigger the hotkey for extracting the message, and AIM may receive a hotkey message. However, since there is no new message for AIM, AIM may not process the hotkey message. In this case, the user may not extract the message of BIM. This circumstance may not meet expectations of the user, and may cause obsession to the user and affect user experience.

In circumstance 2: AIM, BIM, and CIM are running simultaneously, AIM successfully registers the hotkey for extracting a message, but AIM exits. At this time, if a message is sent to BIM, the hotkey for extracting the message may not be triggered when the user presses Ctrl+Atl+Z. As such, the user may not extract the message of BIM. This circumstance may not meet the expectations of the user, and may cause the obsession to the user and affect the user experience.

Figure 1:
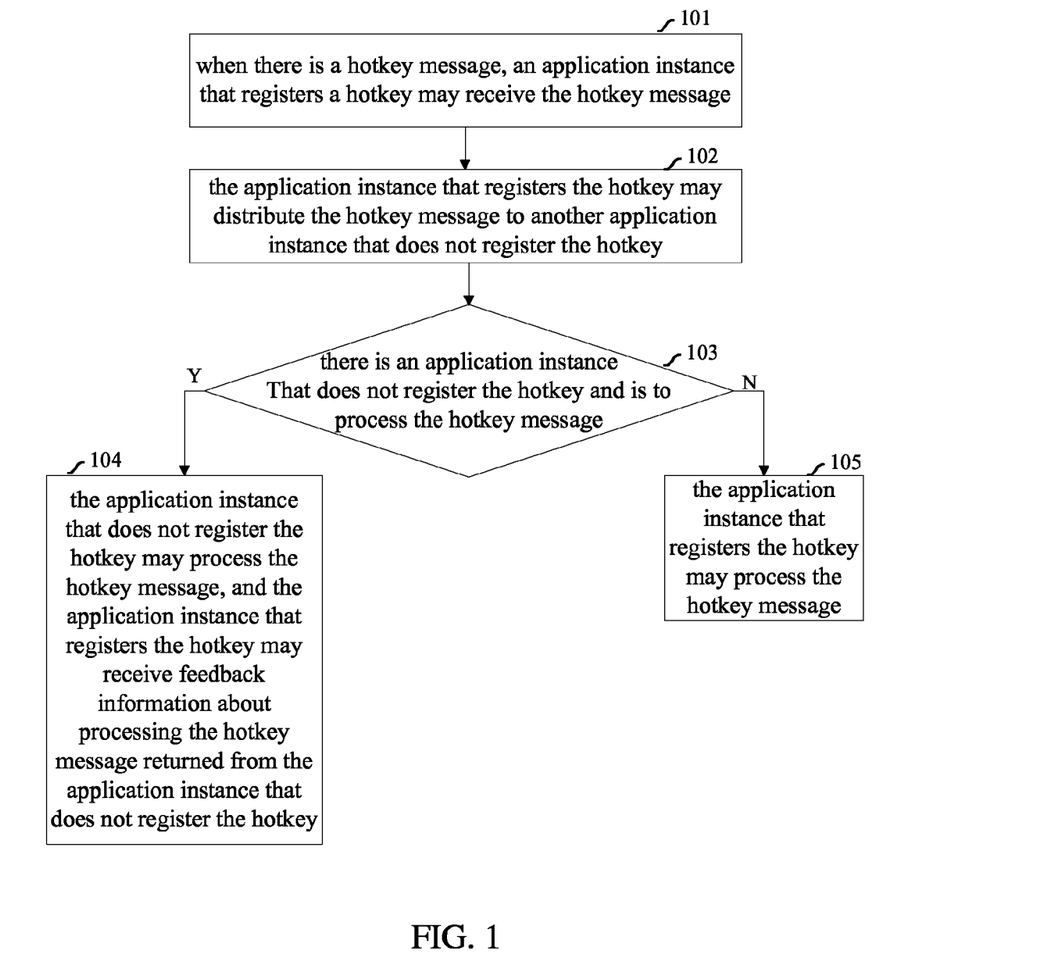
FIG. 1 is a flowchart illustrating a method for sharing a hotkey between application instances, according to an example of the present disclosure.

FIG. 1 is a flowchart illustrating a method for sharing a hotkey between application instances, according to an example of the present disclosure. As shown in FIG. 1, the method may include the following operations.

In block 101, when there is a hotkey message, an application instance that registers a hotkey may receive the hotkey message.

According to an example of the present disclosure, an application instance may be a plurality of application instances with a same application type. In this case, each of a plurality of the application instances with the same application type may initiate a register request for registering a hotkey when the application instance is started up. Since these application instances may run applications with the same type, the hotkeys registered by these application instances may be identical. For example, with regard to an IM application, a hotkey like Ctrl+Atl+Z may be a hotkey for extracting a message. When a plurality of IM application instances are started up, each of a plurality of the IM application instances may attempt to register the hotkey Ctrl+Atl+Z as the hotkey for extracting a message.

Then, it may be determined whether a hotkey to be registered by an application instance which may firstly initiate a register request for registering the hotkey has already been occupied by an application with another type (i.e., the application with the other type may not be the IM application). If the hotkey is not occupied by the application with the other type, the application instance which may firstly initiate the register request for registering the hotkey may successfully register the hotkey. If the hotkey is occupied by the application with the other type and the application with the other type is running, it may be determined that the hotkey is occupied, and it may be prompted to the IM application instance which may firstly initiate the register request for registering the hotkey that hotkey registration is failed. In this case, the IM application instance which may firstly initiate the register request for registering the hotkey may further be prompted to change the hotkey and to re-register the changed hotkey.

When a user presses the hotkey, that is, a hotkey message appears, the application instance that registers the hotkey may receive the hotkey message.

In block 102, the application instance that registers the hotkey may distribute the hotkey message to an application instance that does not register the hotkey.

In block 103, it may be determined whether there is an application instance that does not register the hotkey and is to process the hotkey message. In response to a determination that there is the application instance that does not register the hotkey and is to process the hotkey message, operations in block 104 may be performed and the process may be ended. In response to a determination that there is not the application instance that does not register the hotkey and is to process the hotkey message, operations in block 105 may be performed and the process may be ended.

In block 104, the application instance that does not register the hotkey may process the hotkey message, and the application instance that registers the hotkey may receive feedback information about processing the hotkey message returned from the application instance that does not register the hotkey.

In block 105, the application instance that registers the hotkey may process the hotkey message.

According to an example of the present disclosure, the method as shown in FIG. 1 may further include determining the application instance that registers the hotkey from the application instances. Specifically, one or more than one application instances may initiate a register request for registering a hotkey. It may be determined whether the hotkey is occupied by an application with another type. When the hotkey is not occupied, an application instance that may firstly initiate the register request for registering the hotkey may register the hotkey. When the hotkey is occupied, it may be prompted to the application instance that may firstly initiate the register request for registering the hotkey that hotkey registration is failed.

According to an example of the present disclosure, the method as shown in FIG. 1 may further include:

pre-configuring a hotkey re-registration order;

when the application instance that registers the hotkey exits, sending, according to the hotkey re-registration order, a hotkey register message to an application instance in a next order of the application instance that registers the hotkey, so that the application instance in the next order may register the hotkey.

In this case, when there is a hotkey message of the hotkey once again, the application instance in the next order may receive the hotkey message, distribute the hotkey message to the application instance that does not register the hotkey, and may determine whether there is an application instance that does not register the hotkey and is to process the hotkey message. In response to a determination that there is the application instance that does not register the hotkey and is to process the hotkey message, the application instance that does not register the hotkey may process the hotkey message, and the application instance in the next order may receive feedback information indicating that the hotkey message is processed returned from the application instance that does not register the hotkey. Otherwise, in response to a determination that there is not the application instance that does not register the hotkey and is to process the hotkey message, the application instance in the next order may process the hotkey message.

According to an example of the present disclosure, the operation of configuring the hotkey re-registration order may include:

configuring an order of start-up time points of a plurality of application instances as the hotkey re-registration order; and/or configuring a chronological order of a plurality of the application instances for receiving the hotkey register message as the hotkey re-registration order.

In examples of the present disclosure, the application instances may be a plurality of application instances with a same application type, or be a plurality of application instances with different application types.

In examples of the present disclosure, an application instance may be run on a personal computer, or may exist in the form of a web page, or may be run on a wireless device like a mobile phone.

Although some specific application types are enumerated above to describe the examples of the present disclosure, those skilled in the art may recognize that the enumeration may be for illustrative purposes and may not be intended to limit the protection scope of the present disclosure.

In fact, these application instances may belong to different application types. In this case, examples of the present disclosure may be applied to a plurality of application instances that may belong to applications with different application types and may desire to register a same hotkey.

Hereinafter, examples of the present disclosure may be described in further detail taking a plurality of application instances with the same application type as an exemplary example. However, those skilled in the art may recognize that the description may be illustrative and may not be intended to limit the protection scope of the examples of the present disclosure.

According to an example of the present disclosure, when a plurality of application instances with a same type are running, each of a plurality of the application instances with the same type may register a hotkey to the system when each of the application instances is started up. For each of a plurality of the application instances, if the hotkey registration is successful, the hotkey registration process may be ended. If the hotkey is registered by an application with another type, a hotkey registration failure message may be returned to a user, and the user may be prompted to change the hotkey and to re-register the changed hotkey. If the hotkey is not registered by the application with the other type but the registration is failed, the application instance may query, through crossing processes, a plurality of the application instances with the same type one by one whether the hotkey is successfully registered. If one query result returned is success, the query may be interrupted, and the hotkey registration process may be ended. If all query results returned are failure (i.e., all of other application instances with the same type do not register the hotkey), a prompt may be popped up to prompt the user that the hotkey registration is failed and the hotkey cannot be used.

Figure 2:
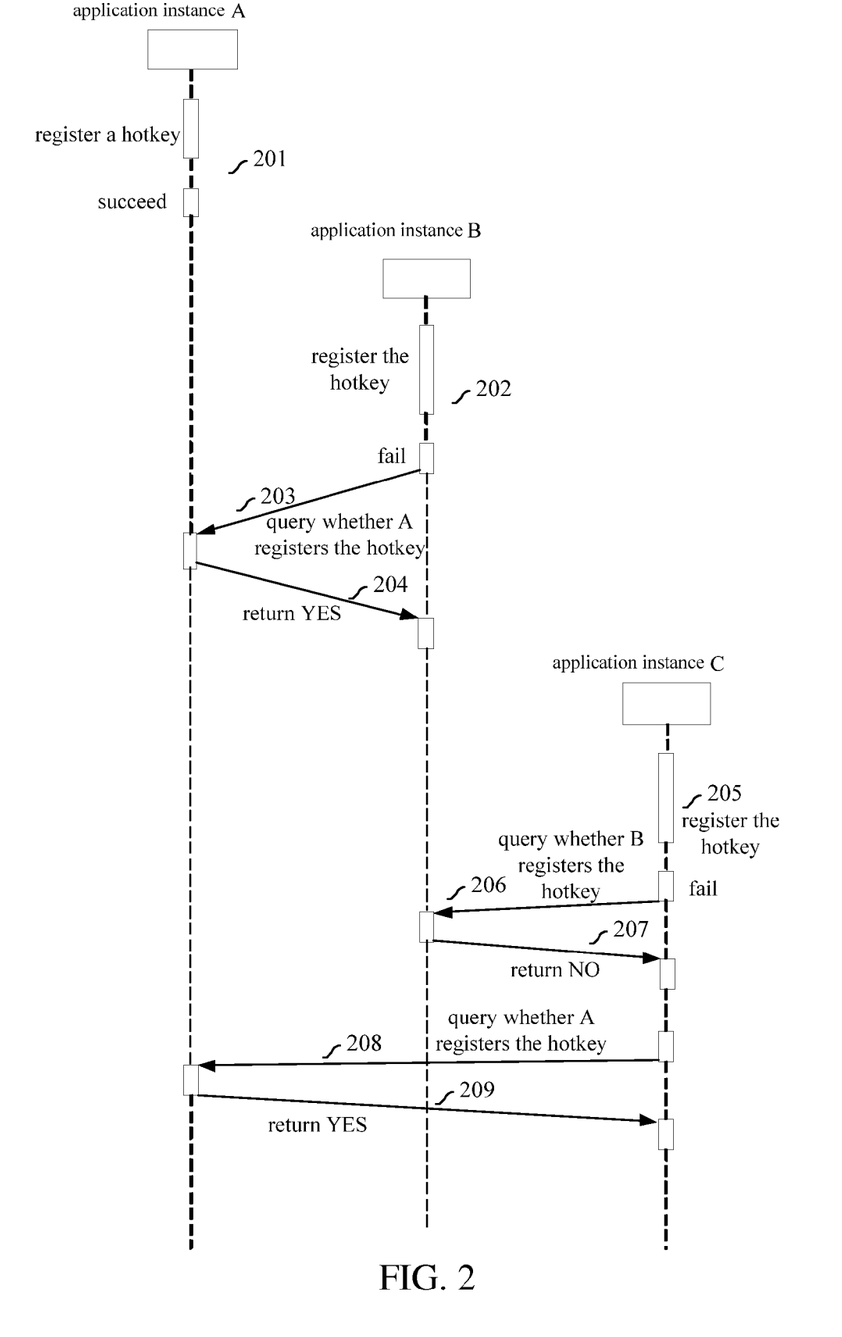
FIG. 2 is a flowchart illustrating a process of registering a hotkey by a plurality of application instances with a same type, according to an example of the present disclosure.

FIG. 2 is a flowchart illustrating a process of registering a hotkey by a plurality of application instances with a same type, according to an example of the present disclosure. As shown in FIG. 2, the process may include the following processes.

In process 201, an application instance A may initiate a register request for registering a hotkey S (i.e., a combination of some keys) to an operating system, and may successful registers the hotkey S.

In process 202, an application instance B may initiate the register request for registering the hotkey S to the operating system. The operating system may receive the register request, determine that the application instance A has registered the hotkey S, and may return a hotkey registration failure message to the application instance B.

In process 203, the application instance B may send a query message to the application instance A to query whether the application instance A has registered the hotkey S.

In process 204, the application instance A may send a reply message to the application instance B to inform application instance B that the application instance A has registered the hotkey S. The application instance B may receive the reply message, and analyze the reply message to determine that the hotkey S has been registered by the application instance A.

In process 205, an application instance C may initiate the register request for registering the hotkey S to the operating system. The operating system may receive the register request, determine that the application instance A has registered the hotkey S, and may return the hotkey registration failure message to the application instance C.

In process 206, the application instance C may send a query message to the application instance B to query whether the application instance B has registered the hotkey S.

In process 207, the application instance B may send a reply message to the application instance C to inform application instance C that the application instance B does not register the hotkey S.

In process 208, the application instance C may send a query message to the application instance A to query whether the application instance A has registered the hotkey S.

In process 209, the application instance A may send a reply message to the application instance C to inform application instance C that the application instance A has registered the hotkey S. The application instance C may determine, through analyzing the reply message, that the hotkey S is registered by the application instance A.

So far, operations for registering a hotkey by a plurality of application instances with a same type may be achieved. In this case, when a user presses the hotkey, the system may pop up a hotkey message, and the application instance that registers the hotkey may receive the hotkey message. The application instance that registers the hotkey may distribute, through crossing processes, the hotkey message to the application instances with the same type that do not register the hotkey one by one. Each of other application instances that do not register the hotkey may receive the cross-process hotkey message, and may determine, according to a situation of the application instance itself, whether to process the hotkey message. If an application instance that does not register the hotkey may determine to process the hotkey message, the application instance that does not register the hotkey may process the hotkey message and may return a message indicating that the hotkey message is processed to the application instance that registers the hotkey. If an application instance that does not register the hotkey may determine not to process the hotkey message, the application instance that does not register the hotkey may return a message indicating that the hotkey message is not processed to the application instance that registers the hotkey. When one returned message indicating that the hotkey message is processed is received, the application instance that registers the hotkey may interrupt remaining distribution. If all messages returned are the message indicating that the hotkey message is not processed, the application instance that registers the hotkey may determine whether to process the hotkey message according to a situation of the application instance that registers the hotkey.

A hotkey for extracting an IM message may be taken as an example. It may be assumed that two IM application instances with a same application type are running, in which the two IM application instances may respectively be referred to as AIM and BIM. In this case, Ctrl+Atl+Z may be registered by AIM as the hotkey for extracting an IM message and BIM does not register the hotkey. When a user presses Ctrl+Atl+Z to trigger the hotkey for extracting an IM message, AIM may receive a hotkey message and may distribute the hotkey message to BIM. After receiving the hotkey message, BIM may determine whether to process the hotkey message according to a situation of BIM. Specifically, BIM may check whether there is an IM message of BIM. If there is the IM message of BIM, BIM may extract the IM message and return to AIM a message indicating that the hotkey message is processed. If there is not the IM message of BIM, BIM may not process the hotkey message and return to AIM a message indicating that the hotkey message is not processed. At this time, AIM may determine whether to process the hotkey message according to a situation of AIM. Specifically, AIM may check whether there is an IM message of AIM. If there is the IM message of AIM, AIM may extract the IM message. If there is not the IM message of AIM, AIM may not process the hotkey message.

According to this logic, after receiving a hotkey message of the system, the application instance that registers the hotkey may firstly send the hotkey message to an application instance that does not register the hotkey, while the application instance that registers the hotkey may be the last application instance that may process the hotkey message. By this manner, all of the application instances (both the application instance that registers the hotkey and the application instance that does not register the hotkey) may have an opportunity to process the hotkey message.

Figure 3:
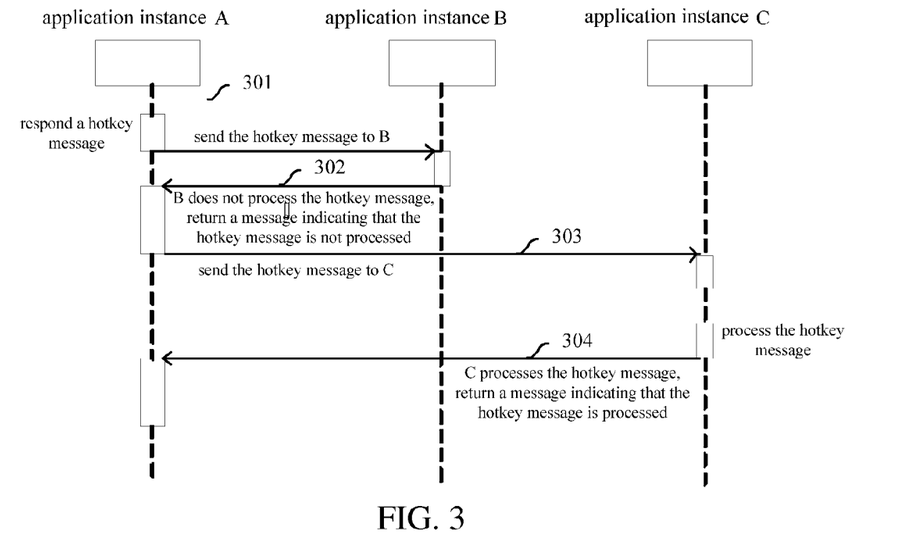
FIG. 3 is a flowchart illustrating a process of processing a hotkey message by an application instance that does not register a hotkey, according to an example of the present disclosure.

Based on the above detailed analysis and the process as shown in FIG. 2, FIG. 3 is a flowchart illustrating a process of processing a hotkey message by an application instance that does not register a hotkey, according to an example of the present disclosure. The example as shown in FIG. 3 may be an exemplary application example after registering a hotkey based on the process as shown in FIG. 2. As may be seen from the process as shown in FIG. 2, in the example of the present disclosure, the application instance A registers the hotkey. As shown in FIG. 3, the process may include the following processes.

In process 301, when a user triggers the hotkey S, the application instance A may receive a hotkey message, and may send the hotkey message to the application instance B.

In process 302, the application instance B may receive the hotkey message, and may determine whether to process the hotkey message. In this case, the application instance B may determine not to process the hotkey message, and may return a message indicating that the hotkey message is not processed to the application instance A.

In process 303, the application instance A may receive the message indicating that the hotkey message is not processed sent from the application instance B, and may send the hotkey message to the application instance C.

In process 304, the application instance C may receive the hotkey message, and may determine whether to process the hotkey message. In this case, the application instance C may determine to process the hotkey message. The application instance C may process the hotkey message, and may return a message indicating that the hotkey message is processed to the application instance A.

Figure 4:
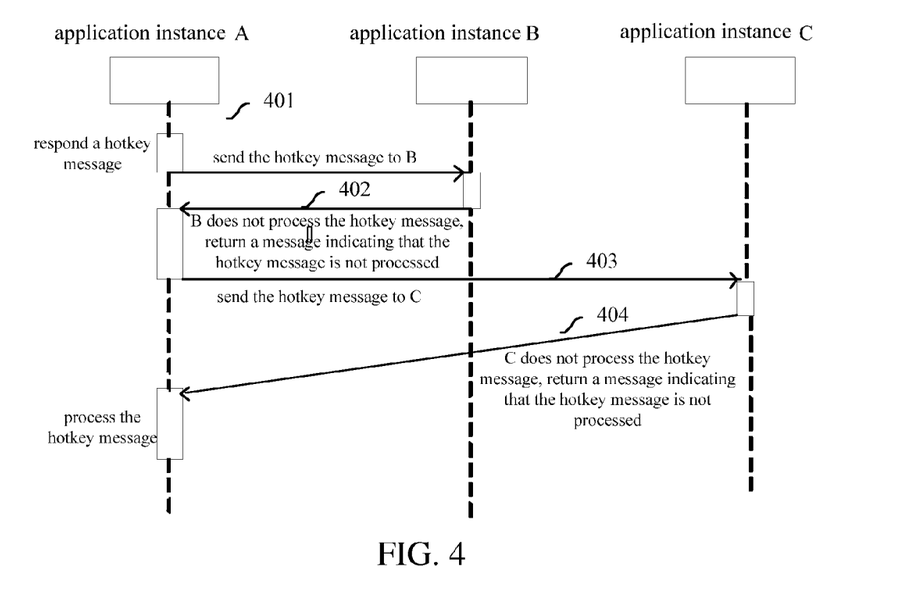
FIG. 4 is a flowchart illustrating a process of processing a hotkey message by an application instance that registers a hotkey, according to an example of the present disclosure.

Based on the above detailed analysis and the process as shown in FIG. 2, FIG. 4 is a flowchart illustrating a process of processing a hotkey message by an application instance that registers a hotkey, according to an example of the present disclosure. The example as shown in FIG. 4 may be an exemplary application example after registering a hotkey based on the process as shown in FIG. 2. As may be seen from the process as shown in FIG. 2, in the example of the present disclosure, the application instance A registers the hotkey. As shown in FIG. 4, the process may include the following processes.

In process 401, when a user triggers the hotkey S, the application instance A may receive a hotkey message and may send the hotkey message to the application instance B.

In process 402, the application instance B may receive the hotkey message, and may determine whether to process the hotkey message. In this case, the application instance B may determine not to process the hotkey message, and may return a message indicating that the hotkey message is not processed to the application instance A.

In process 403, the application instance A may receive the message indicating that the hotkey message is not processed sent from the application instance B, and may send the hotkey message to the application instance C.

In process 404, the application instance C may receive the hotkey message, and may determine whether to process the hotkey message. In this case, the application instance C may determine not to process the hotkey message, and may return the message indicating that the hotkey message is not processed to the application instance A.

In process 405, the application instance A may receive the message indicating that the hotkey message is not processed sent from the application instance C, determine that all of the application instances that do not register the hotkey are not to process the hotkey message, and may process the hotkey message based on a situation of the application instance A.

Based on the above detailed analysis, examples of the present disclosure may also provide a system for sharing a hotkey between application instances.

Figure 5:
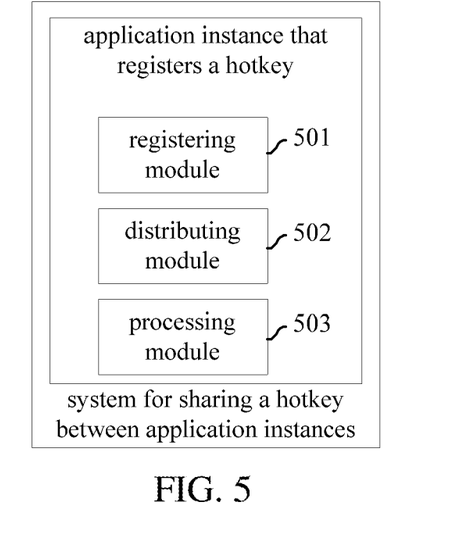
FIG. 5 is a schematic diagram illustrating a structure of a system for sharing a hotkey between application instances, according to an example of the present disclosure.

FIG. 5 is a schematic diagram illustrating a structure of a system for sharing a hotkey between application instances, according to an example of the present disclosure. As shown in FIG. 5, the system may include an application instance that registers a hotkey, which may include a registering module 501, a distributing module 502, and a processing module 503, in which when there is a hotkey message of the hotkey, the registering module 501 may receive the hotkey message;
the distributing module 502 may distribute the hotkey message to an application instance that does not register the hotkey, in which the hotkey message is received by the registering module 501; and
the processing module 503 may determine whether there is an application instance that does not register the hotkey and is to process the hotkey message; in response to a determination that there is the application instance that does not register the hotkey and is to process the hotkey message, receive feedback information about processing the hotkey message returned from the application instance that does not register the hotkey; otherwise, in response to a determination that there is not the application instance that does not register the hotkey and is to process the hotkey message, process the hotkey message received by the registering module 501.

According to an example of the present disclosure, the application instances may have a same application type.

According to an example of the present disclosure, the registering module 501 may further initiate a register request for registering the hotkey.

Figure 6:
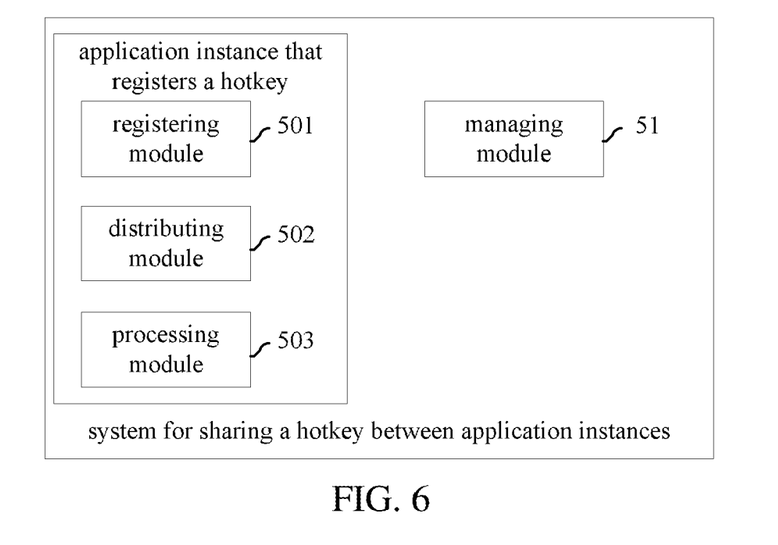
FIG. 6 is a schematic diagram illustrating a structure of a system for sharing a hotkey between application instances, according to another example of the present disclosure.

Based on the system structure as shown in FIG. 5, FIG. 6 is a schematic diagram illustrating a structure of the system for sharing a hotkey between application instances, according to another example of the present disclosure. As shown in FIG. 6, the system for sharing the hotkey between the application instances as shown in FIG. 5 may further include a managing module 51. The managing module 51 may receive a register request for registering a hotkey initiated by one or more than one application instances; determine whether the hotkey to be registered by an application instance that may firstly initiate the register request for register the hotkey is occupied by an application with another type; when the hotkey is not occupied, register the hotkey for the application instance that may firstly initiate the register request for registering the hotkey; when the hotkey is occupied, prompt the application instance that may firstly initiate the register request for registering the hotkey that hotkey registration is failed.

According to an example of the present disclosure, after prompting the application instance that may firstly initiate the register request for registering the hotkey that the hotkey registration is failed, the managing module 51 may prompt the application instance that may firstly initiate the register request for registering the hotkey to change the hotkey and to re-register the changed hotkey.

According to an example of the present disclosure, when the application instance that registers the hotkey exits, the application instance that registers the hotkey may send the hotkey register message to the application instances that do not register the hotkey and have a same type as the application instance that registers the hotkey one by one. At this time, an application instance which firstly receives the hotkey register message may re-perform the hotkey registration process as shown in FIG. 2.

According to an example of the present disclosure, the registering module 501 may further pre-configure a hotkey re-registration order; when the application instance that registers the hotkey exits, send, according to the hotkey re-registration order, the hotkey register message to an application instance in a next order of the application instance that registers the hotkey, so that the application instance in the next order may register the hotkey.

In this case, the hotkey re-registration order may include:
an order of start-up time points of a plurality of application instances; and/or
a chronological order of a plurality of the application instances for receiving the hotkey register message.

According to an example of the present disclosure, the application instance in the next order of the application instance that registers the hotkey may include:
a registering module, to receive, when there is a hotkey message of the hotkey, the hotkey message of the hotkey;
a distributing module, to distribute the hotkey message to an application instance that does not register the hotkey; and
a processing module, to determine whether there is an application instance that does not register the hotkey and is to process the hotkey message; in response to a determination that there is the application instance that does not register the hotkey and is to process the hotkey message, receive feedback information about processing the hotkey message returned from the application instance that does not register the hotkey; otherwise, in response to a determination that there is not the application instance that does not register the hotkey and is to process the hotkey message, process the hotkey message.

The functions of the registering module, the distributing module, and the processing module included in the application instance in the next order of the application instance that registers the hotkey may be the same as the functions of the registering module 501, the distributing module 502, and the processing module 503 included in the application instance that registers the hotkey in the system as shown in FIG. 5.

As may be seen that when the technical solution of cross-process hotkey sharing between application instances with a same type or between applications with various types provided by examples of the present disclosure are employed, hotkey conflict between applications may be solved, the hotkey resources may be shared, and the user experience may further be optimized.

Hereinafter, examples of the present disclosure may be described in further detail taking an IM application as an example. For the IM application, the solution of cross-process hotkey sharing provided by the examples of the present disclosure may be achieved by means of component object model (COM) remote call. Specifically, an IM component may be created firstly, and a set of interfaces (which may include an IMAPI interface and an IMMainCreator interface) may be implemented based on a COM specification. The IM component and the set of interfaces may be registered in the system. Among them, the IMAPI interface may provide a method for querying whether a hotkey is registered and a method for responding a hotkey message. The IMMainCreator interface may provide a method for traversing all of IM application instances, and may return all of the IMAPI interfaces to a caller.

When an IM application instance fails to register a hotkey, the IM application instance may obtain, from the system, the IM component and the IMMainCreator interface of the IM component. The IMMainCreator interface may obtain, through the method for traversing all of the IM application instances, IMAPI interfaces of all of IM application instances that are currently running, and may call the IMAPI interfaces one by one to query whether the hotkey is registered. In this case, if an IMAPI interface returns a message indicating that the hotkey is registered, remaining calling may be interrupted, and the process may be ended. If all of the IMAPI interfaces may return a message indicating that the hotkey is not registered, a prompt may be popped up to inform the user (this operation may be specifically defined by a specific product), and the process may be ended.

When an IM application instance receives a hotkey message of the system, the IM application instance may obtain, from the system, the IM component and the IMMainCreator interface of the IM component. The IMMainCreator interface may obtain, through the method for traversing all of the IM application instances, IMAPI interfaces of all of IM application instances that are currently running, and may call the IMAPI interfaces one by one to response the hotkey message. In this case, if an IMAPI interface returns a message indicating that the hotkey message is processed, remaining calling may be interrupted, and the process may be ended. If all of the IMAPI interfaces may return a message indicating that the hotkey message is not processed, the IM application instance that receives the system hotkey message may process the hotkey message, and may end the process.

The above example may describe how to achieve the cross-process hotkey sharing by means of the COM remote call. Examples of the present disclosure may not be limited to this exemplary example. The cross-process hotkey sharing may also be achieved by means of various ways such as a shared memory, or an anonymous pipe, etc.

Similarly, although the above examples of the present disclosure may be descried taking the IM application as an example, examples of the present disclosure may not be limited to the IM application. The examples of the present disclosure may also be applied to any other appropriate scenarios.

When examples of the present disclosure are employed, the aforementioned three IM application instances AIM, BIM, and CIM may still be taken as an example.

In case 1 which employs the examples of the present disclosure, AIM, BIM, and CIM may run simultaneously, and AIM may successfully register a hotkey for extracting a message. At this time, a message is sent to BIM. A user may press Ctrl+Atl+Z to trigger the hotkey for extracting the message, and AIM may receive a hotkey message. After receiving the hotkey message, AIM may forward the hotkey message to BIM (alternatively, AIM may forward the hotkey message to CIM; CIM may determine that CIM does not need to process the hotkey message, and may return a message indicating that the hotkey message is not processed to AIM; AIM may receive the message indicating that the hotkey message is not processed and may forward the hotkey message to BIM). BIM may receive the hotkey message, detect that there is a new message, pop up the new message, and may return a message indicating that the hotkey message is processed to AIM. This solution meets the user's expectations, and enhances the user experience.

In case 2 which employs the examples of the present disclosure, AIM, BIM, and CIM may run simultaneously, AIM may successfully register a hotkey for extracting a message and then exit. When AIM exits, AIM may send a hotkey register message (which may also be referred to as a hotkey release message) to BIM and CIM, respectively, so as to notify BIM and CIM to re-register the hotkey. BIM and CIM may receive the hotkey register message, and may register the hotkey immediately. However, according to a predetermined order, an IM application instance that firstly registers the hotkey may successfully register the hotkey. In this case, assuming that BIM successfully registers the hotkey, as such, BIM may take the place of AIM. When the user presses Ctrl+Atl+Z to trigger the hotkey for extracting a message, BIM may receive a hotkey message and may distribute the hotkey message. This solution meets the user's expectations, and enhances the user experience.

Although the above examples of the present disclosure may be descried taking the IM application as an example, those skilled in the art may recognize that the enumeration may be for illustrative purposes and may not be intended to limit the protection scope of the present disclosure.

As may be seen from the above description that according to examples of the present disclosure, when there is a hotkey message, an application instance that registers a hotkey may receive the hotkey message, distribute the hotkey message to an application instance that does not register the hotkey, and may determine whether there is an application instance that does not register the hotkey and is to process the hotkey message. In response to a determination that there is the application instance that does not register the hotkey and is to process the hotkey message, the application instance that does not register the hotkey may process the hotkey message, and the application instance that registers the hotkey may receive feedback information about processing the hotkey message returned from the application instance that does not register the hotkey. Otherwise, in response to a determination that there is not the application instance that does not register the hotkey and is to process the hotkey message, the application instance that registers the hotkey may process the hotkey message. As may be seen that when examples of the present disclosure are employed, after receiving the hotkey message, the application instance that registers the hotkey may firstly send the hotkey message to the application instance that does not register the hotkey, and the application instance that registers the hotkey may process the hotkey message when the application instance that does not register the hotkey may not need to process the hotkey message. By this manner, all of the application instances (both the application instance that registers the hotkey and the application instance that does not register the hotkey) may have an opportunity to process the hotkey message. As such, hotkey conflict between application instances (either between applications with different application types or between different application instances belonging to applications with a same type) may be solved, so that the hotkey resources may be shared and the accuracy of hotkey response may be improved.

Further, when the examples of the present disclosure are employed, between application instances, when an application instance that currently registers a hotkey exits, the application instance that currently registers the hotkey may notify a next application instance to register the hotkey, so that the transitivity of the hotkey may be ensured, the hotkey may be shared, and the accuracy of hotkey response may be improved.

The above are several examples of the present disclosure, and are not used for limiting the protection scope of the present disclosure. Any modifications, equivalents, improvements, etc., made under the spirit and principle of the present disclosure should be included in the protection scope of the present disclosure.

The invention claimed is:

1. A method for sharing a hotkey between application instances, comprising:
when there is a hotkey message of a first hotkey, receiving, by an application instance that registers the first hotkey, the hotkey message;
determining whether there is an application instance that does not register a first hotkey and is to process the hotkey message;
distributing, by the application instance that registers the first hotkey, the hotkey message to an application instance that does not register the first hotkey;
in response to determining that there is the application instance that does not register the first hotkey and is to process the hotkey message, receiving feedback information about processing the hotkey message returned from the application instance that does not register the first hotkey and is to process the hotkey message; and
in response to determining that there is not the application instance that does not register the first hotkey and is to process the hotkey message, processing, by the application instance that registers the first hotkey, the hotkey message.

2. The method of claim 1, wherein the application instance that registers the first hotkey and the application instance that does not register the first hotkey have a same application type.

3. The method of claim 2, further comprising:
initiating, by one or more than one application instances, a register request for registering the first hotkey;
determining whether the first hotkey is occupied by an application with another type;
if the first hotkey is not occupied, registering the first hotkey for an application instance which first initiates the register request for registering the first hotkey; and
if the first hotkey is occupied, prompting the application instance which first initiates the register request for registering the first hotkey that registration of the first hotkey is failed.

4. The method of claim 2, further comprising:
pre-configuring a hotkey re-registration order;
when the application instance that registers the first hotkey exits, sending, according to the hotkey re-registration order, a hotkey register message to an application instance in a next order of the application instance that registers the first hotkey, so that the application instance in the next order registers the first hotkey.

5. The method of claim 4, wherein the operation of pre-configuring the hotkey re-registration order comprises at least one of configuring an order of start-up time points of a plurality of application instances as the hotkey re-registration order and configuring a chronological order of a plurality of the application instances for receiving the hotkey register message as the hotkey re-registration order.

6. The method of claim 1, further comprising:
determining the application instance that registers the first hotkey from application instances through a component object model (COM) remote call mode, a shared memory mode, or an anonymous pipe mode.

7. A system for sharing a hotkey between application instances, comprising a first application instance, wherein the first application instance registers a first hotkey and comprises:
a registering module, to receive, when there is a hotkey message of the first hotkey, the hotkey message;
a distributing module, to distribute the hotkey message to an application instance that does not register the first hotkey; and
a processing module, to
determine whether there is an application instance that does not register the first hotkey and is to process the hotkey message,
in response to determining that there is the application instance that does not register the first hotkey and is to process the hotkey message, receive feedback information about processing the hotkey message returned from the application instance that does not register the first hotkey and is to process the hotkey message; and
in response to determining that there is not the application instance that does not register the first hotkey and is to process the hotkey message, process the hotkey message.

8. The system of claim 7, wherein the first application instance and the application instance that does not register the first hotkey have a same application type.

9. The system of claim 8, further comprising:
a managing module, to
receive a register request for registering the first hotkey initiated by one or more than one application instances,
determine whether the first hotkey is occupied by an application with another type;
when the first hotkey is not occupied, register the first hotkey for an application instance which firstly initiates the register request for registering the first hotkey; and
when the first hotkey is occupied, prompt the application instance which firstly initiates the register request for registering the first hotkey that registration of the first hotkey is failed.

10. The system of claim 8, wherein the registering module is further to
pre-configure a hotkey re-registration order;
when the first application instance exits, send, according to the hotkey re-registration order, a hotkey register message to an application instance in a next order of the first application instance, so that the application instance in the next order registers the first hotkey.

11. The system of claim 10, wherein the hotkey re-registration order comprises at least one of an order of start-up time points of a plurality of application instances and a chronological order of a plurality of the application instances for receiving the hotkey register message.

* * * * *